US010311734B2

(12) United States Patent
Aoyagi

(10) Patent No.: US 10,311,734 B2
(45) Date of Patent: Jun. 4, 2019

(54) OPERATION CONTROL APPARATUS

(71) Applicant: Mitsubishi Electric Corporation, Tokyo (JP)

(72) Inventor: Takahisa Aoyagi, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/526,178

(22) PCT Filed: Jan. 9, 2015

(86) PCT No.: PCT/JP2015/050469
§ 371 (c)(1),
(2) Date: May 11, 2017

(87) PCT Pub. No.: WO2016/110999
PCT Pub. Date: Jul. 14, 2016

(65) Prior Publication Data
US 2017/0352271 A1    Dec. 7, 2017

(51) Int. Cl.
*B60R 16/023*    (2006.01)
*G08G 1/16*    (2006.01)

(52) U.S. Cl.
CPC .................... *G08G 1/16* (2013.01)

(58) Field of Classification Search
USPC ................................................ 340/435, 903
See application file for complete search history.

(56) References Cited

U.S. PATENT DOCUMENTS 8,660,778 B2 *    2/2014    Taguchi ................ 701/117
9,042,872 B1 *    5/2015    Breed et al. .......... 455/569.2
(Continued)

FOREIGN PATENT DOCUMENTS

JP    7-3100 U    1/1995
JP    2002-49998 A    2/2002
(Continued)

OTHER PUBLICATIONS

International Search Report of PCT/JP2015/050469, dated Apr. 7, 2015 (PCT/ISA/210).
(Continued)

*Primary Examiner* — Brent Swarthout
(74) *Attorney, Agent, or Firm* — Sughrue Mion, PLLC; Richard C. Turner

(57) ABSTRACT

An operation control apparatus mounted in a vehicle includes a dangerous region determination section which sets a dangerous region in a vehicle travel direction from the vehicle in accordance with the travel speed of the vehicle, and when an obstacle is detected in the dangerous region, determines that it is dangerous to operate an in-car electrical component equipped in the vehicle; an operation detection section which detects that an operation of the in-car electrical component is done; and a dangerous operation recognition section which, when it is determined in the dangerous region determination section that an operation of the in-car electrical component is dangerous, and it is detected in the operation detection section that an operation of the in-car electrical component is done, recognizes a dangerous operation and outputs a signal for issuing an alarm.

7 Claims, 8 Drawing Sheets

(56) References Cited

U.S. PATENT DOCUMENTS

| | | | |
|---|---|---|---|
| 2001/0040505 A1 | 11/2001 | Ishida et al. | |
| 2004/0124697 A1* | 7/2004 | MacGregor | B60T 17/08 303/89 |
| 2004/0181334 A1* | 9/2004 | Blumbergs | G01C 21/26 701/538 |
| 2004/0254728 A1* | 12/2004 | Poropat | G01S 17/107 701/301 |
| 2010/0297930 A1* | 11/2010 | Harris | H04K 3/415 455/1 |
| 2013/0057397 A1* | 3/2013 | Cutler | B62D 15/0255 340/435 |
| 2016/0096529 A1* | 4/2016 | Davidsson | B60Q 9/008 340/576 |
| 2017/0210288 A1* | 7/2017 | Briggs | B60Q 9/00 |
| 2017/0334374 A1* | 11/2017 | Naboulsi | B60R 16/0232 |

FOREIGN PATENT DOCUMENTS

| | | | |
|---|---|---|---|
| JP | 2005-308645 A | 11/2005 |
| JP | 2008-117054 A | 5/2008 |
| JP | 2010-122997 A | 6/2010 |
| JP | 2012-234410 A | 11/2012 |
| JP | 2013-186767 A | 9/2013 |

OTHER PUBLICATIONS

Communication dated Jan. 16, 2018, issued by the Japanese Patent Office in counterpart Japanese Application No. 2016-568241.

\* cited by examiner

OPERATION CONTROL APPARATUS

CROSS REFERENCE TO RELATED APPLICATIONS

This application is a National Stage of International Application No. PCT/JP2015/050469 filed Jan. 9, 2015, the contents of all of which are incorporated herein by reference in their entirety.

TECHNICAL FIELD

The present invention relates to an operation control apparatus which is equipped in a vehicle in order to safely carry out an operation of an in-car electrical component.

BACKGROUND ART

In recent years, in order to cope with crashes/rear-end collisions occurring due to driver distraction, a vehicle control system, such as a vehicle's automatic brake or an auto cruise control, which utilizes a variety of sensors has been put into production for the purpose of reducing vehicle crashes. In the same system, it is common that ahead of a vehicle on the front side, a pedestrian, or the like, is recognized by sensing, and that a warning is given using a warning sound, or the like, when there is a danger of collision by still keeping on driving, and the brake is automatically applied when there is no remediation even after the warning.

However, in the heretofore mentioned vehicle control system, it may happen that a collision is avoided by the brake operating automatically, but as the same system just assists in making up for the driving deficiency of the driver, there is no guarantee that the system operates under any circumstances, and the driver him/herself eventually has to be certain to drive safely on the driver's own responsibility. Because of this, the system has not reached a fundamental solution to the problem of encouraging the driver to drive safely so as to prevent the driver him/herself from performing a dangerous action while driving. As the same system is such that a warning sound is emitted although the driver is aware of danger, the system may become annoying to the driver.

Also, the citation list shows a technology of reducing the driver's discomfort in the situation of lane departure, illustrating that the discomfort is reduced by turning down the warning sound when the driver starts a lane keeping operation. However, as the warning sound is emitted invariably when there is a lane departure, the warning sound is also emitted, for example, when the driver consciously departs intentionally from a lane within the range of safe driving (for example refer to PTL 1).

CITATION LIST

Patent Literature

PTL 1: JP-A-2008-117054

SUMMARY OF INVENTION

Technical Problem

Herein, consider the case of carrying out an operation of an in-car electrical component while driving the vehicle. For example, when there is a vehicle ahead of the driver's vehicle on the front side, and the driver's vehicle is traveling on a road at a high speed, it is considered to be a case in which it is dangerous for the driver to carry out an operation of the in-car electrical component and in which a warning is required. On the other hand, when there is no vehicle ahead, and the driver's vehicle is traveling at a low speed, it is considered to be a case in which it is no problem to carry out a control operation of the in-car electrical component after securing safety and in which no warning is required.

That is, it is necessary to adopt a configuration such that a warning for encouraging the driver to drive safely is given only in a case in which the situation is that an operation of the in-car electrical component is dangerous, and in which the warning is required, and a configuration such that the warning is given in a case in which the situation is not that an operation of the in-car electrical is dangerous, and in which the warning is not required.

The invention, having been contrived to solve the heretofore mentioned problems, has for its object to obtain an operation control apparatus which determines, based on vehicle travel conditions, whether or not an operation of an in-car electrical component is dangerous.

Solution to Problem

An operation control apparatus according to the invention includes a dangerous region determination section which, when an obstacle is detected in a dangerous region which is set in a vehicle travel direction from a vehicle in accordance with the travel speed of the vehicle, determines that it is dangerous to operate an in-car electrical component equipped in the vehicle.

Advantageous Effects of Invention

According to the operation control apparatus of the invention, it can be determined, by the dangerous region determination section, whether or not an operation of the in-car electrical component equipped in the vehicle is dangerous. Because of this, unnecessary warning sounds or the like can be reduced by giving no warning or the like against the operation of the in-car electrical component in the situation in which it is determined that the operation of the in-car electrical component is not dangerous.

Objects, features, aspects, and advantageous effects of the invention other than the heretofore mentioned will become more apparent from the following detailed description of the invention referring to the drawings.

DESCRIPTION OF EMBODIMENTS

Embodiment 1

Figure 1:
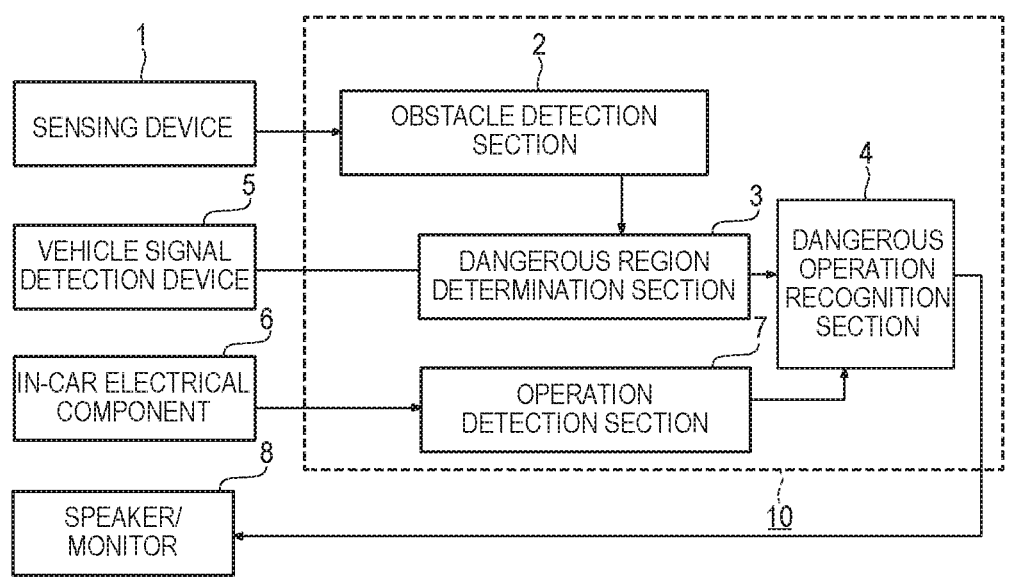
FIG. 1 is a configuration diagram of an operation control apparatus according to Embodiment 1 of the invention.

Hereafter, a description will be given, using FIGS. 1 to 5, of an operation control apparatus according to Embodiment 1 of the invention. FIG. 1 is a configuration diagram showing an operation control apparatus, which carries out an operation control of an in-car electrical component, and a configuration of vehicle equipment relating to the apparatus. Operational control flows of component sections of the operation control apparatus are shown one each in FIGS. 2 to 5. In the individual drawings, identical or equivalent members and regions will be described with identical signs.

A vehicle which a driver drives (a driver's car or a driver's vehicle) is equipped with a sensing device 1 for detecting an obstacle around the driver's car. The sensing device 1 acquires a sensing result around the driver's car and notifies an obstacle detection section 2, which configures an operation control apparatus 10, of the result.

Herein, the sensing device 1 is a device which detects an obstacle around the vehicle using a camera, millimeter waves, ultrasonic waves, a laser, a radar, or the like. The sensing result denotes a camera image, a sensing waveform, or the like.

The obstacle detection section 2 recognizes what a sensing object is, and calculates the distance between the vehicle and the obstacle, based on the sensing result notified of by the sensing device 1 which detects an obstacle around the vehicle, and notifies a dangerous region determination section 3 of a result of the recognition and a result of the calculation.

Figure 2:
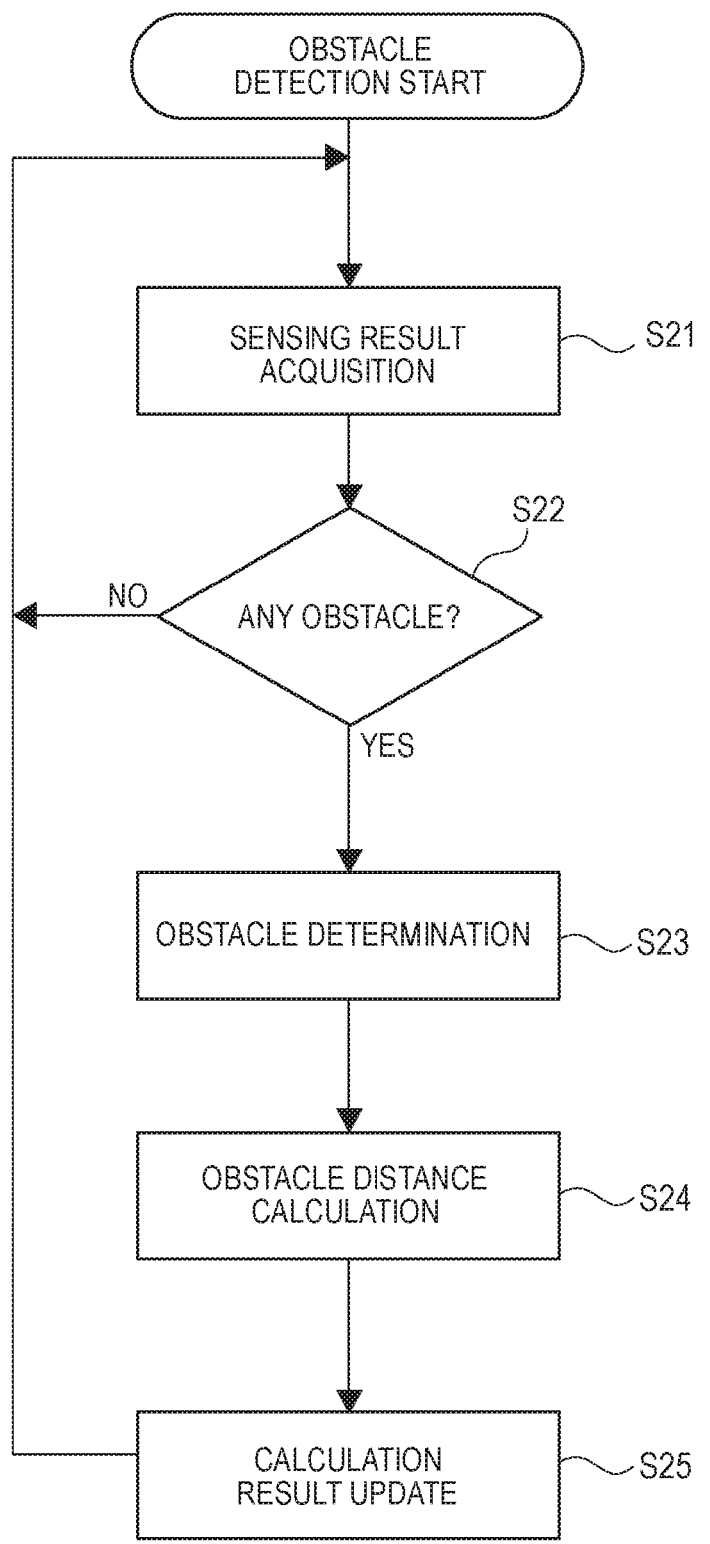
FIG. 2 is a flowchart showing an operation of an obstacle detection section configuring the operation control apparatus of Embodiment 1 of the invention.

An obstacle detection operation of the obstacle detection section 2 will be illustrated using the flowchart of FIG. 2. When an obstacle detection starts, a sensing result in the travel direction of the driver's car is acquired from the sensing device 1 (S21). As the travel direction is on the front side of the vehicle when causing the vehicle to move forward, a sensing result ahead of the vehicle is acquired, and as the travel direction is on the back side of the vehicle when causing the vehicle to move backward, a sensing result behind the vehicle is acquired. Next, it is determined based on a sensing result whether or not there is an obstacle in the travel direction of the vehicle (S22). When it is determined that there is no obstacle, the flowchart returns to the sensing result acquisition (S21), and when there is an obstacle, the type of what the obstacle is determined (S23). Next, the distance from the driver's vehicle to the obstacle is calculated (S24). The distance is calculated when the type of the obstacle is an object, such as a vehicle, a building, a person, or a bicycle, a collision with which should be avoided, and it is not necessary to calculate the distance in the case of an obstacle, such as rain drops, snow, or leaves, which does not have to be avoided. Next, the recognition result including the type of the obstacle and the distance to the obstacle is updated as a calculation result of the obstacle detection section 2 (S25). Herein, the time needed for the driver's vehicle and the obstacle to come close to each other differs, and the degree of danger also differs, between when the obstacle is a vehicle traveling ahead and travels at the same speed as the driver's vehicle and when the obstacle is an immobile building. The degree of danger will be determined in the dangerous region determination section 3 to be described hereafter. After the calculation result is updated, the flowchart returns to the sensing result acquisition (S21).

In the heretofore mentioned example, it is illustrated that the sensing device 1 is an existing device provided in the vehicle and is not included in the operation control apparatus 10, but when there is no existing sensing device 1 in the vehicle, a configuration is adopted such that the sensing device 1 is included in the operation control apparatus 10.

Meanwhile, a vehicle signal detection device 5 equipped in the vehicle detects a vehicle signal of a car speed, a steering wheel angle, gear information, or the like, and notifies the dangerous region detection section 3, which configures the operation control apparatus 10, of this vehicle information. The dangerous region determination section 3, based on the vehicle information of the vehicle signal detection device 5, sets a dangerous region beyond the driver's control as opposed to a region in which the driver can afford recognition, determination, and control or to a region in which the driver can control the automatic brake or the like, and notifies a dangerous operation recognition section 4 of the dangerous region. The dangerous region is set so as to correspond to the distance needed for the vehicle to stop in the vehicle travel direction from the vehicle. Also, the dangerous region set in the dangerous region determination section 3 is set so as to be wide when the travel speed of the vehicle is high and narrow when the travel speed is low.

Furthermore, the dangerous region determination section 3 acquires the calculation result of the obstacle detection section 2, and determines whether the situation is that an obstacle exists in the set dangerous region and that an operation of an in-car electrical component 6 is dangerous (the degree of danger is at high level), or whether the situation is that no obstacle exists in the dangerous region and that it is not dangerous to carry out an operation of the in-car electrical component 6 (the degree of danger is at low level). Furthermore, the dangerous region determination section 3 determines the danger degree level of an operation of the in-car electrical component based on conditions such as the distance between an obstacle existing in the dangerous region and the vehicle. The danger degree level may vary depending also on the type of an obstacle.

For example, in a dangerous region determination operation, in a dangerous region calculation step, as there is no dangerousness of collision when the speed of the driver's vehicle is 0 km/h (that is, while stopping), it is determined that there is no dangerous region. Also, for example, as the stopping distance is generally taken to be 80 m when the speed of the driver's vehicle is 80 km/h, the dangerous region can be calculated at 80 m.

Herein, when the degree of danger is at high level, the level can be divided into smaller levels depending on the positional relationship between the driver's vehicle and an obstacle and on the type of the obstacle. When it is determined that it is necessary to issue an alarm in the dangerous operation recognition section 4 to be described hereafter, the division of the degree of danger into small levels can help in setting the degree of representation of the alarm, such as the volume of a speaker, or the size of display on a monitor, when outputting the alarm. For example, when the degree of danger is at a very high level, a warning sound can be output at a large volume of sound, and when an obstacle is in the dangerous region, but the degree of danger is small, a warning sound can be output at a small volume of sound.

Figure 3:
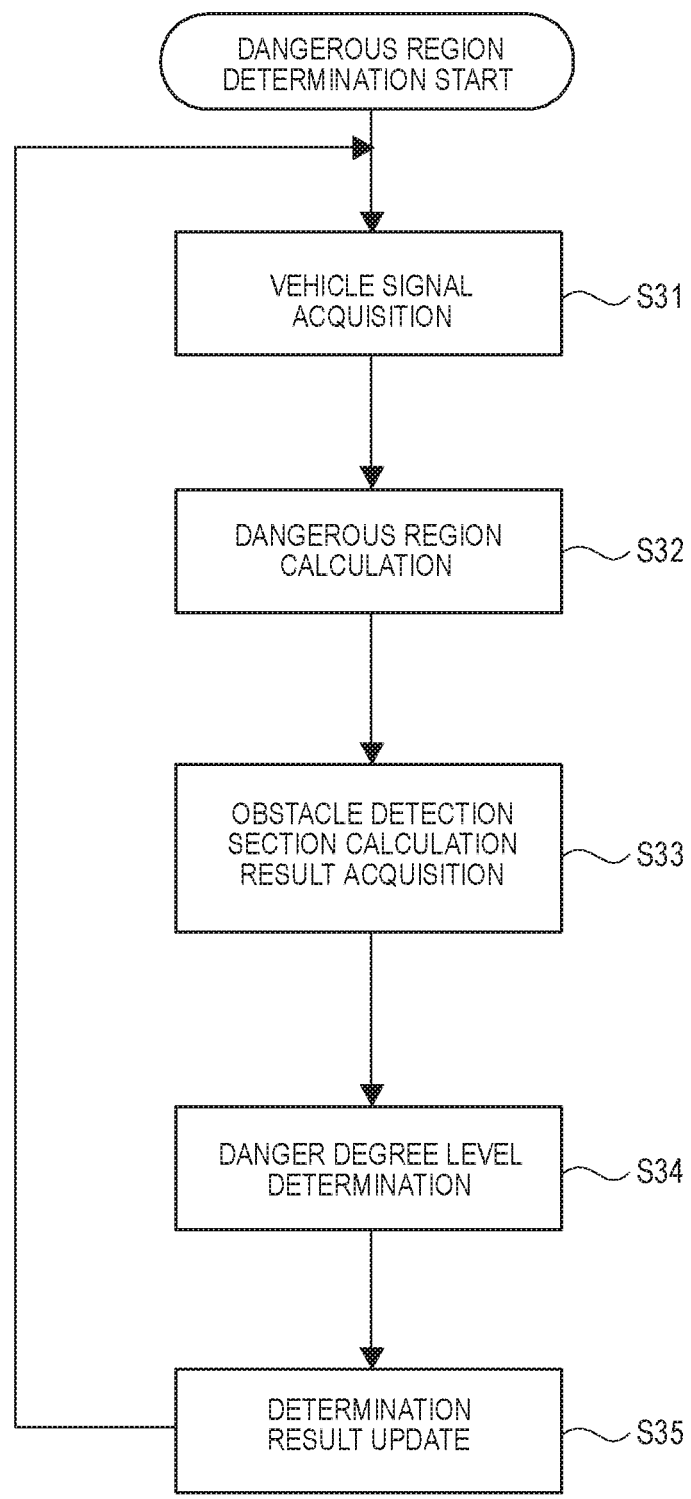
FIG. 3 is a flowchart showing an operation of a dangerous region determination section configuring the operation control apparatus of Embodiment 1 of the invention.

A dangerous region determination operation of the dangerous region determination section 3 will be illustrated using the flowchart of FIG. 3. When a dangerous region determination starts, a vehicle signal is acquired from the vehicle signal detection device 5 (S31). Based on the vehicle signal, a dangerous region is set in the vehicle travel direction from the vehicle (S32). Next, a latest calculation result is acquired from the obstacle detection section 2 (S33). Next, by comparing the dangerous region calculated in S32 and the distance to the obstacle which is acquired in S33, a danger degree level determination in the dangerous region is carried out such as by determining whether or not the situation is that an operation of the in-car electrical component 6 is dangerous, and furthermore, the degree of danger of the operation. (S34). A determination result obtained in S34 is updated (S35). After updating the calculation result, the flowchart returns to the vehicle signal acquisition (S31).

It is illustrated in the heretofore mentioned example that the vehicle signal detection device 5 is an existing device provided in the vehicle and is not included in the operation control apparatus 10, but when the vehicle is not equipped with the vehicle signal detection device 5, a configuration is adopted such that the vehicle signal detection device 5 is included in the operation control apparatus 10.

Next, the in-car electrical component 6 shown in FIG. 1 denotes an electrical component (a vehicle electrical component operating device), which is equipped in the vehicle and has a switch or the like operable in the car, for example, an operating portion of a car navigation system, car audio, or air conditioner. An operation detection section 7 configuring the operation control apparatus 10 detects whether or not an operation of the switch or the like is carried out in the in-car electrical component 6, and notifies the dangerous operation recognition section 4 of a result of the detection.

The dangerous operation recognition section 4, based on the determination result from the dangerous region determination section 3 and on the detection result from the operation detection section 7 to be described hereafter, recognizes whether or not a dangerous operation of the in-car electrical component 6 is carried out in the situation in which the degree of danger is at high level and in which an obstacle, such as a vehicle travelling ahead, is detected in the dangerous region. When a dangerous operation is carried out, the dangerous operation recognition section 4 determines that it is necessary to issue an alarm, such as a warning sound or warning display. When no dangerous operation is carried out, the dangerous operation recognition section 4 issues no alarm even when the degree of danger is at high level.

Figure 4:
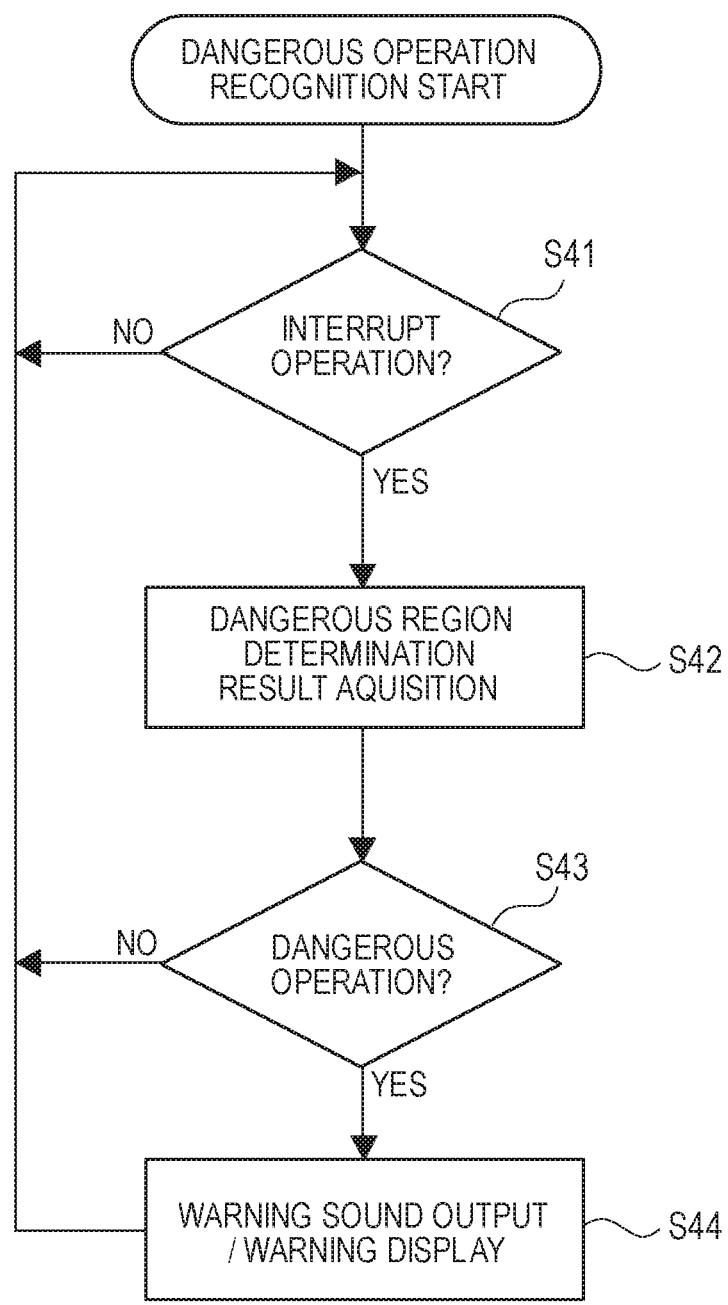
FIG. 4 is a flowchart showing an operation of a dangerous operation recognition section configuring the operation control apparatus of Embodiment 1 of the invention.

Herein, a dangerous operation recognition operation of the dangerous operation recognition section 4 will be illustrated using the flowchart of FIG. 4. When a dangerous operation recognition starts, information is acquired from the operation detection section 7 to be described hereafter, an operation of the in-car electrical component 6 is carried out, and it is determined whether or not there is an interrupt operation (S41). When it is determined that there is no interrupt operation, the flowchart returns to the determination in S41, and when there is an interrupt operation, a determination result of the dangerous region determination section 3 is acquired (S42). Next, based on the information, obtained in the dangerous region determination section 3, about whether or not an obstacle exists in the dangerous region and about the distance to the obstacle and the danger degree level, it is determined whether there is a dangerous operation wherein the in-car electrical component 6 is operated in the situation in which there is an obstacle in the dangerous region (the degree of danger is at high level), or whether an operation of the in-car electrical component 6 is an operation in the situation, in which there is no obstacle in the dangerous region, and is no dangerous operation, and when there is no dangerous operation, the flowchart returns to S41 (S43). Next, following the recognition of a dangerous operation in S43, a signal for giving a warning sound output and warning display is output to a speaker/monitor 8 (S44). Subsequently, the flowchart returns to the interrupt operation presence/absence determination (S41).

Figure 5:
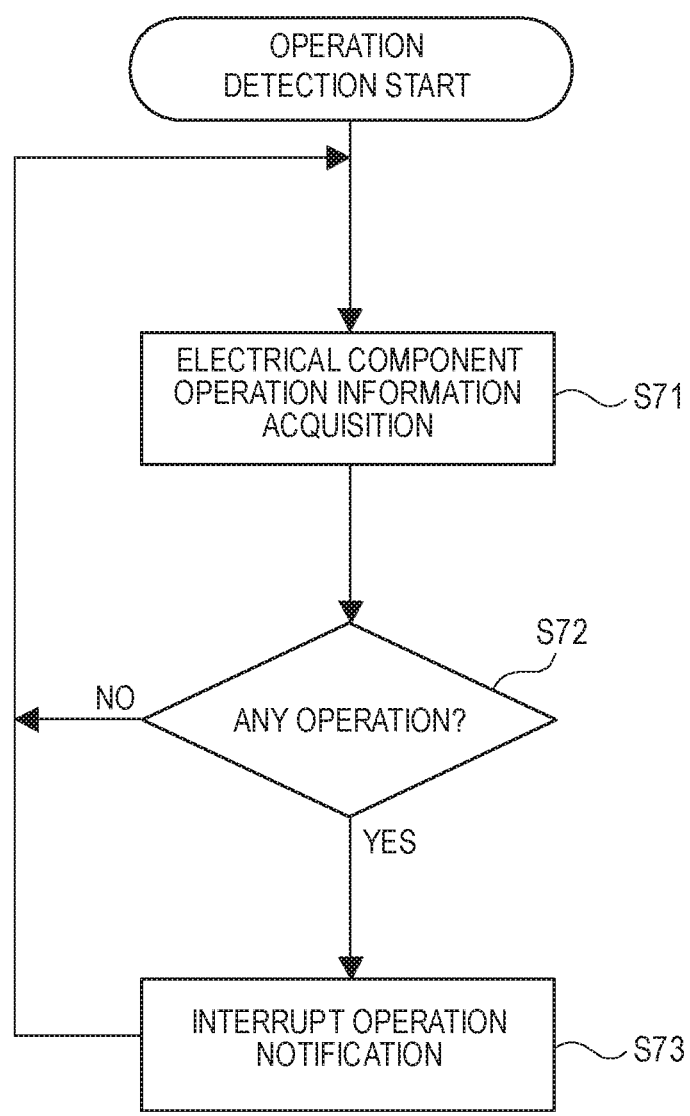
FIG. 5 is a flowchart showing an operation of an operation detection section configuring the operation control apparatus of Embodiment 1 of the invention.

Also, an in-car electrical component 6 operation detection operation of the operation detection section 7 will be illustrated using the flowchart of FIG. 5. When an operation detection starts, electrical component operation information is acquired from the in-car electrical component 6 (S71). Next, an operation of the in-car electrical component 6 is carried out, and it is determined whether there is an interrupt operation (S72). When it is determined that there is no interrupt operation, the flowchart returns to the electrical component operation information acquisition in S71, and when there is an interrupt operation, the dangerous operation recognition section 4 is notified of the interrupt operation (S73). Subsequently, the flowchart returns to the electrical component operation information acquisition (S71).

The dangerous operation recognition section 4, when recognizing a dangerous operation of the in-car electrical component 6, outputs a signal for outputting an alarm (a warning requirement signal) to a speaker (a sound output device), a monitor (an image display device), or the speaker/monitor 8 which is an output portion representing the two.

The speaker/monitor 8, upon receiving the warning requirement signal from the dangerous operation recognition section 4, generates a warning sound in the car, or displays warning details on the monitor, and thereby issues an alarm to the extent that it is a dangerous situation to operate the in-car electrical component 6, thus encouraging the driver to drive safely. Herein, the speaker/monitor 8 denotes, for example, the speaker and monitor of a car navigation system.

In the heretofore described example, it is illustrated that when recognizing a dangerous operation wherein the in-car electrical component 6 is operated in the situation in which an obstacle exists in the dangerous region, an alarm is issued in the car via the speaker/monitor 8 mounted in the vehicle. However, it is also possible to more effectively encourage the driver to drive safely not only by issuing an alarm, but by controlling the in-car electrical component 6 so as to cancel or forbid the operation of the in-car electrical component 6 at the stage at which the dangerous region determination section 3 recognizes that an obstacle exists in the dangerous region and that the degree of danger is at high level.

Also, it is also possible to encourage the driver to drive safely by warning the driver by adopting a configuration such that when the operation detection section 7 detects that the in-car electrical component 6 is operated when in the state in which the operation of the in-car electrical component 6 is cancelled or forbidden, a signal, with which to display, using an audio output or a screen output, that the operation is cancelled or forbidden, is output to the speaker/monitor 8 from the dangerous operation recognition section 4.

As heretofore mentioned, according to the operation control apparatus 10 of the invention, when an obstacle is detected in the dangerous region set in the vehicle travel direction from the vehicle in accordance with the travel speed of the vehicle, it is determined that an operation of the in-car electrical component 6 is dangerous (the degree of danger is at high level), and when no obstacle is detected in the dangerous region, it is determined that the operation of the in-car electrical component 6 is not dangerous (the degree of danger is at low level). Therefore, there is the advantageous effect that when the operation of the in-car electrical component 6 is not dangerous, no alarm is issued by operating the in-car electrical component 6, thus preventing the driver from being annoyed by excessive warning display.

Also, in the situation in which it is determined that an operation of the in-car electrical component 6 is dangerous, an alarm is issued only when the operation (dangerous operation) of the in-car electrical component 6 is carried out, and no alarm is issued when there is no dangerous operation, and it is possible to suppress excessive warning display, and thus possible to reduce an annoyance which the driver feels.

By adopting a configuration such as to output a danger degree level determination result to one portion of the display screen of the in-car monitor in the form of symbols, characters, diagrams, colors, or the like, the driver can easily confirm the degree of danger of an in-car electrical component operation when sliding a glance at the in-car monitor. In this case, for example, by giving an audio warning only when a dangerous operation of the in-car electrical component 6 is carried out, it is possible to reduce the annoyance of warning sound which the driver feels.

Also, it goes without saying that by setting the upper limit of the car speed, at which the in-car electrical component 6 can be operated, in the dangerous region determination section 3 or dangerous operation recognition section 4 of the operation control apparatus 10, it is possible to cancel or forbid the operation of the in-car electrical component 6 while driving at a high speed, and thus possible to encourage the driver to drive safely.

Embodiment 2

Figure 6:
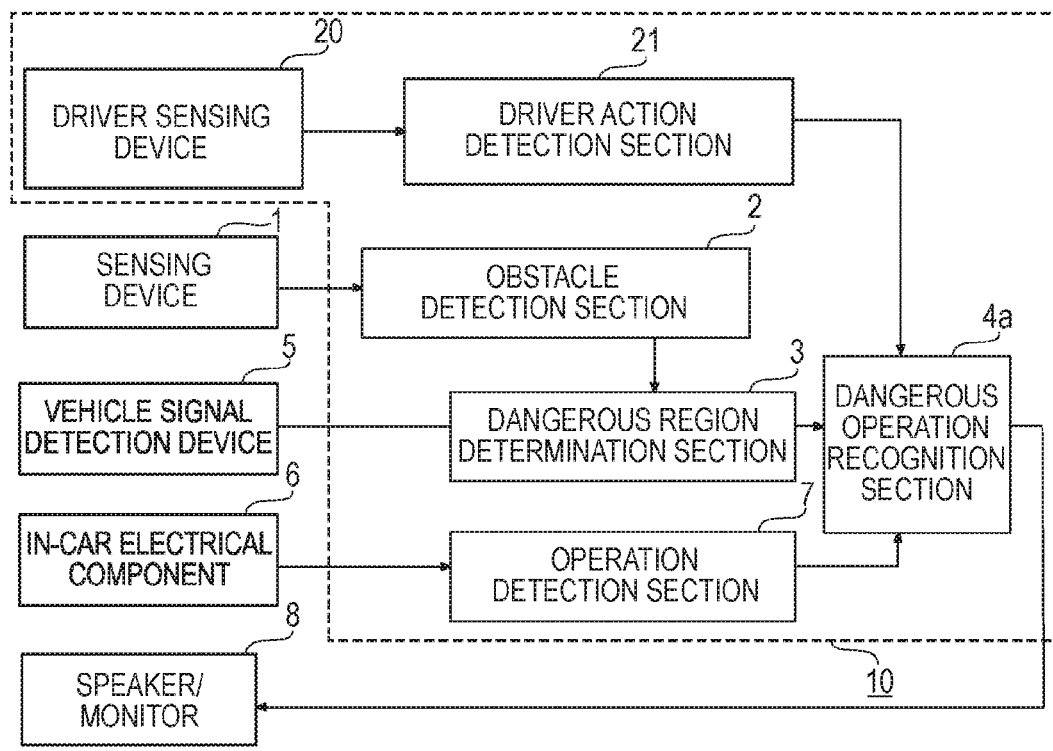
FIG. 6 is a configuration diagram of an operation control apparatus according to Embodiment 2 of the invention.
Figure 7:
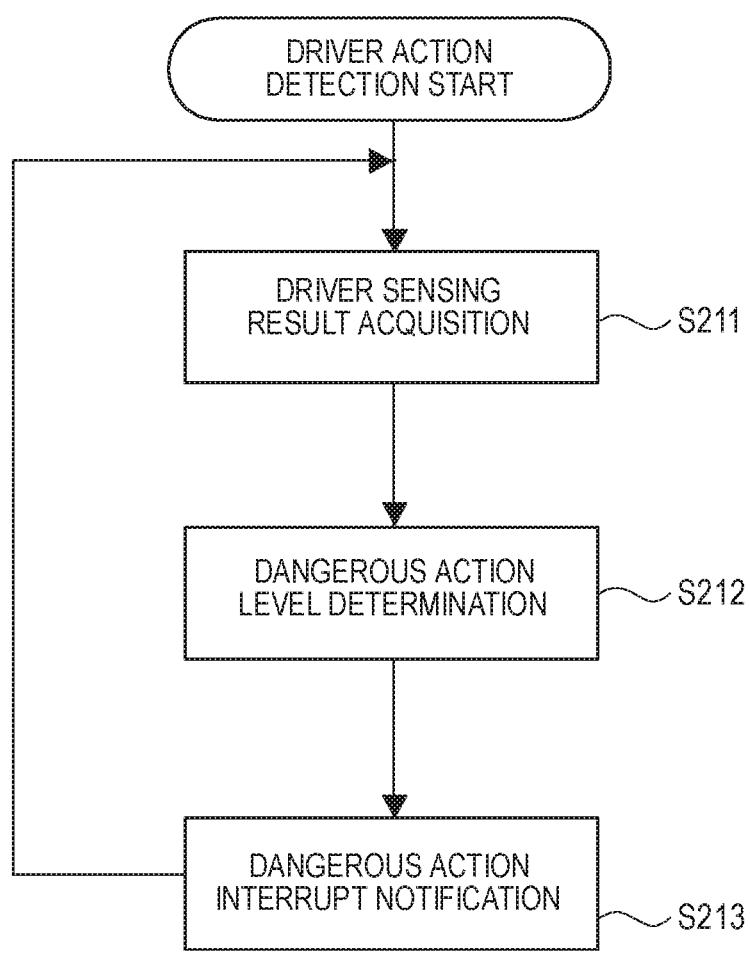
FIG. 7 is a flowchart showing an operation of a driver action detection section configuring the operation control apparatus of Embodiment 2 of the invention.
Figure 8:
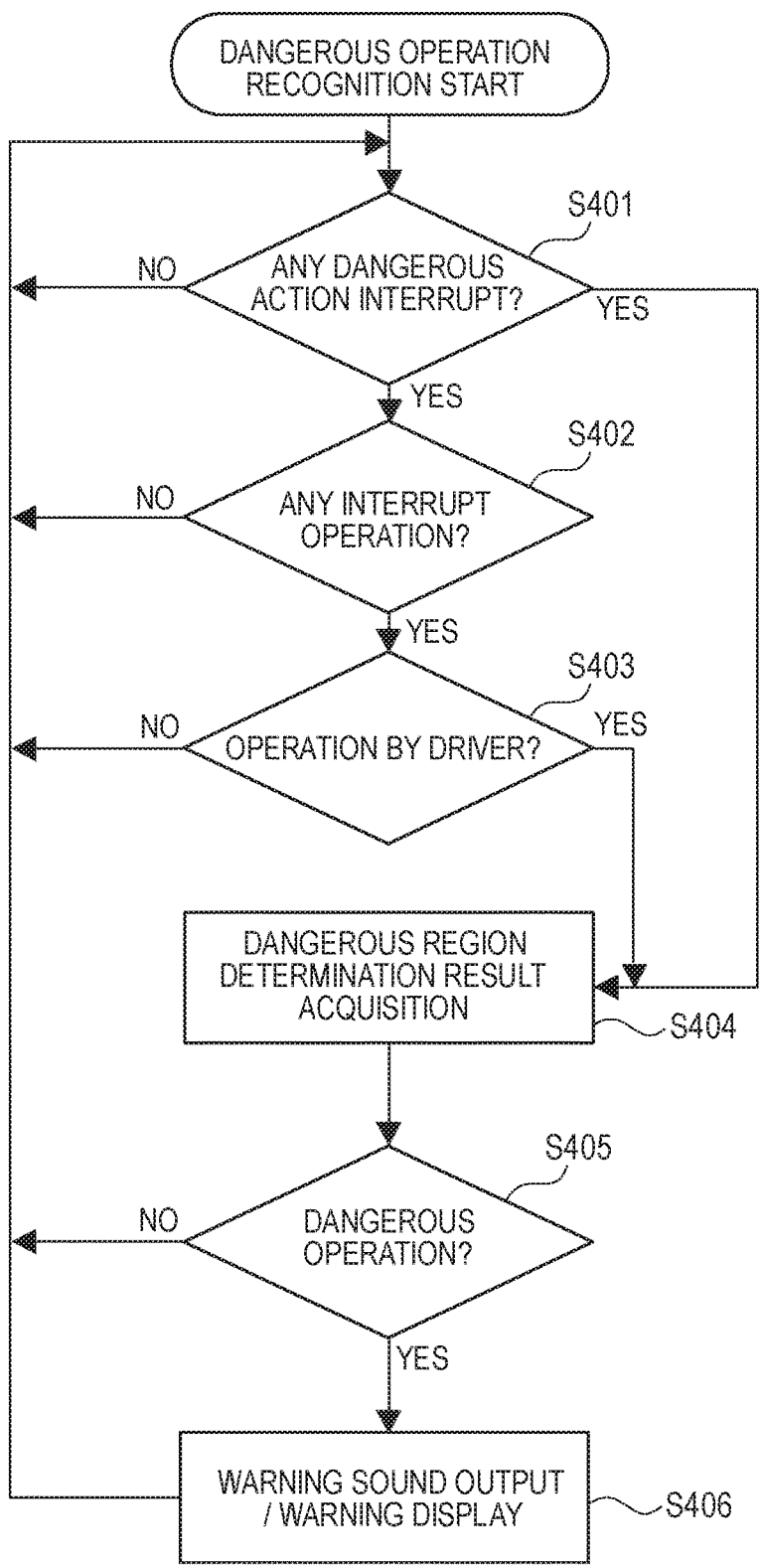
FIG. 8 is a flowchart showing an operation of a dangerous operation recognition section configuring the operation control apparatus of Embodiment 2 of the invention.

A description will be given, using FIGS. 6 to 8, of an operation control apparatus 10 of Embodiment 2 of the invention. FIG. 6 illustrates a configuration diagram showing the operation control apparatus 10 according to Embodiment 2, FIG. 7 illustrates a flowchart showing an operation of a driver action detection section 21 which is a component of the operation control apparatus 10, and FIG. 8 illustrates a flowchart showing an operation of a dangerous operation recognition section 4a. An obstacle detection section 2, a dangerous region determination section 3, and an operation detection section 7, which configure Embodiment 2, as their operations are the same as in Embodiment 1, will be omitted from the description. In the individual drawings, identical or equivalent members and regions will be described with identical signs.

As shown in FIG. 6, the operation control apparatus 10 according to Embodiment 2 is of a configuration such that a driver sensing device 20 and the driver action detection section 21 are added to the heretofore described operation control apparatus 10 of Embodiment 1.

The driver sensing device 20 denotes a device (a sensor device, such as a camera or an infrared sensor) for monitoring the conditions of the driver driving the vehicle. The driver action detection section 21 which detects an action of the driver, such as a face direction, line of sight, or gesture of the driver, is notified of a sensing result (a camera image, a sensor result) of the driver sensing device 20.

The driver action detection section 21 recognizes a face direction, line of sight, gesture, or the like of the driver, and notifies the dangerous operation recognition section 4a of a recognition result. The driver action detection section 21 recognizes a dangerous action of the driver, such as by recognizing a face direction and line of sight such that the driver is looking at a navigation system screen or an air conditioner operating device, or by recognizing a gesture such that the driver is reaching over to operate an operating switch of the operating portion of the navigation system, air conditioner, or the like, and when there is a dangerous action, notifies the dangerous operation recognition section 4a of a dangerous action interrupt.

The dangerous operation recognition section 4a, based on a determination result from the dangerous region determination section 3 and a detection result from the operation detection section 7, and furthermore, on a detection result from the driver action detection section 21, recognizes whether or not the driver is doing a dangerous action in attempt to carry out an operation of the in-car electrical component 6, or whether or not a dangerous operation is done, in the situation in which there is an obstacle in the dangerous region (the degree of danger is at high level). When a dangerous action is recognized, there is an obstacle in the dangerous region, and the degree of danger is at high level, it is recognized that a dangerous operation is done, and an alarm is output to the speaker/monitor 8. Also, in the same way as in the case of Embodiment 1, the in-car electrical component 6 may be urged to cancel/forbid its operation.

Next, an operation of the driver action detection section 21 which monitors a movement of the driver will be illustrated using the flowchart of FIG. 7. When a driver action detection starts, a sensing result is acquired from the driver sensing device 20 (S211). Next, it is determined, based on the sensing result, whether or not there is a dangerous action and whether the degree of danger is at high or low level (S212). When there is a dangerous action, the dangerous operation recognition section 4a is notified of a dangerous action interrupt, and at the same time, of whether the degree of danger of the dangerous action is at high or low level too (S213). After the notification, the flowchart returns to the sensing result acquisition (S211).

Next, a dangerous operation recognition operation of the dangerous operation recognition section 4a will be illustrated using the flowchart of FIG. 8. When an operation of recognizing a dangerous action starts, it is determined, based on information taken in from the driver action detection section 21, whether or not there is a dangerous action interrupt (S401). When there is no dangerous action interrupt, the flowchart returns to the dangerous action interrupt information presence/absence determination (S401), and when there is a dangerous action interrupt and when the degree of danger of the dangerous action is at low level, it is determined whether or not there is an interrupt operation of the in-car electrical component 6 (S402), while when there is a dangerous action interrupt and when the degree of danger of the dangerous action is at high level, the flowchart proceeds to a dangerous region determination result acquisition (S404 (the same as S42)). In S402, when there is no interrupt operation of the in-car electrical component 6, the flowchart returns to the dangerous action interrupt information presence/absence determination (S401), and when there is an interrupt operation, it is determined whether or not it is an operation by the driver (S403). When there is an interrupt operation of the in-car electrical component 6 and it is recognized that it is an operation by the driver, a dangerous region determination result is acquired (S404). Next, it is determined whether or not an operation of the in-car electrical component 6 is a dangerous operation in the situation in which there is an obstacle in the dangerous region and the degree of danger is at high level (S405 (the same as S43)). Next, following the recognition of a dangerous operation in S405, a signal for giving a warning sound output and warning display is output to the speaker/monitor 8 (S406). Subsequently, the flowchart returns to the dangerous action interrupt presence/absence determination (S401).

In S401, when there is a dangerous action interrupt, the flowchart is divided into two cases, the case of proceeding to S402 and the case of proceeding to S404. Herein, for example, a configuration is adopted such that the flowchart proceeds to S404 when the degree of danger is at a certain level or higher based on a result of determining the dangerous action level of a driver's action in the driver action detection section 21, and that in any other case, the flowchart proceeds to S404 after assessing whether or not the in-car electrical component 6 is operated and whether or not the operation is an operation by the driver him/herself. The dangerous action level is determined, for example, by setting the degree of danger of a dangerous action so as to be at high level when it is detected that the time for which the driver looks at the monitor is long.

As heretofore described, according to the operation control apparatus 10 of Embodiment 2, it is possible to issue an alarm when a dangerous operation of the in-car electrical component 6 is carried out in the situation in which it is obvious that danger is incurred while driving, and when there is a dangerous action wherein the driver him/herself is in attempt to carry out a dangerous operation. Therefore, no unnecessary and excessive alarm is generated in the same way as in the heretofore described case of Embodiment 1. Also, as a configuration is such that an alarm can be generated depending on the driver's action, no alarm is issued when an electrical component is operated by a fellow passenger other than the driver, and it is also possible to reduce the annoyance of warning sound or warning display.

As the operation control apparatus 10 of Embodiment 2 is also of a configuration such that only a necessary alarm is issued in the same way as in Embodiment 1, it is possible to suppress a dangerous operation by the driver him/herself when driving, and thus possible to encourage the driver to drive safely.

The invention is such that it is possible to freely combine the individual embodiments, and appropriately modify or omit any one of the individual embodiments, within the scope of the invention.

The invention claimed is:

1. An operation control apparatus, characterized by comprising:
 a dangerous region determination section which, when an obstacle is detected in a dangerous region which is set in a vehicle travel direction from a vehicle in accordance with the travel speed of the vehicle, determines that it is dangerous for a driver of the vehicle to operate an in-car electrical component equipped in the vehicle, and controls a display to display a visual indication that it is dangerous for the driver to operate the in-car electrical component; and
 a driver action detection section which detects an action of the driver attempting to operate the in-car electrical component; and
 a dangerous operation recognition section which:
  in response to the driver action detection section detecting that there is the action of the driver attempting to operate the in-car electrical component while the visual indication that it is dangerous for the driver to operate the in-car electrical component is displayed, controls a speaker to output an audio indication that the attempted operation of the in-car electrical component is prohibited, and outputs, to the in-ear electrical component, a signal for cancelling the attempted operation of the in-car electrical component; and
  while the visual indication that it is dangerous for the driver to operate the in-car electrical component is displayed, and it is determined that there is an action wherein a fellow passenger other than the driver attempts to operate the in-car electrical component, does not control the speaker to output the audio indication that the attempted operation of the in-car electrical component is prohibited.

2. The operation control apparatus according to claim 1, further comprising:
 an obstacle detection section which, upon receiving a sensing result output from a sensing device which detects a situation around the vehicle, calculates the type of the obstacle and the distance from the vehicle to the obstacle.

3. The operation control apparatus according to claim 1, wherein
 the dangerous region determination section, upon receiving an output signal from a vehicle signal detection device which detects a travel condition of the vehicle, sets the dangerous region in the vehicle travel direction from the vehicle, and
 the dangerous region is set so as to be wide when the travel speed of the vehicle is high and narrow when the travel speed is low.

4. The operation control apparatus according to claim 1, wherein
 the dangerous region set in the vehicle travel direction from the vehicle is set so as to correspond to the distance needed for the vehicle to stop.

5. The operation control apparatus according to claim 1, wherein
 the dangerous region determination section determines a degree of danger in accordance with the positional relationship between the vehicle and the obstacle, and changes the expression of the visual indication displayed by the display or the audio indication output by the speaker.

6. The operation control apparatus according to claim 5, wherein
 the speaker is mounted in the vehicle.

7. The operation control apparatus according to claim 5, wherein
 the device is mounted in the vehicle.

* * * * *